United States Patent [19]
Dunn

[11] Patent Number: 5,860,577
[45] Date of Patent: Jan. 19, 1999

[54] CANTILEVERED BIKE RACK

[76] Inventor: Christopher J. Dunn, P.O. Box 2641, San Rafael, Calif. 94912

[21] Appl. No.: 329,840

[22] Filed: Oct. 27, 1994

[51] Int. Cl.[6] ................................... B62J 7/04; B62J 9/02
[52] U.S. Cl. ........................ 224/453; 224/427; 224/435; 224/448; 224/457
[58] Field of Search .................................. 224/39, 32 R, 224/32 A, 30 R, 31, 451, 452, 453, 454, 455, 456, 457, 427, 435, 448; D12/407, 409

[56] References Cited

U.S. PATENT DOCUMENTS

| | | | |
|---|---|---|---|
| D. 236,102 | 7/1975 | Branscom | D12/407 |
| 702,292 | 6/1902 | Edmonds . | |
| 2,713,845 | 7/1955 | Silverman | 220/352 |
| 3,578,027 | 5/1971 | Zopfi | 220/352 |
| 4,295,586 | 10/1981 | Shockley . | |
| 4,760,943 | 8/1988 | Bass et al. . | |
| 4,878,867 | 11/1989 | Dworman et al. | 220/352 |

FOREIGN PATENT DOCUMENTS

| | | |
|---|---|---|
| 112504 | 12/1941 | France . |
| 2681039 | 3/1993 | France . |
| 3831842 | 5/1989 | Germany . |

Primary Examiner—Linda J. Sholl
Attorney, Agent, or Firm—Owen, Wickersham & Erickson, P.C.

[57] ABSTRACT

An elongated bicycle rack and storage device has a clamping device at one end so that it can be attached to and cantilever from the bicycle seat post. The device has an enclosable compartment for relatively small items and an external rack frame for supporting larger items when the bicycle is in use.

5 Claims, 2 Drawing Sheets

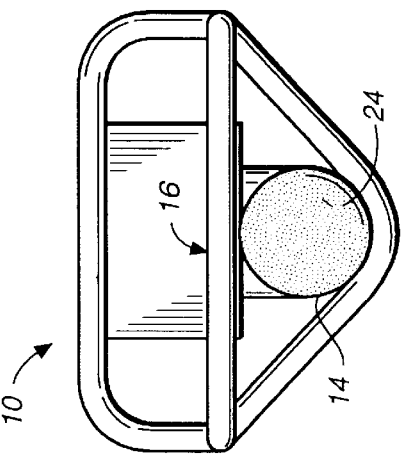
FIG._4
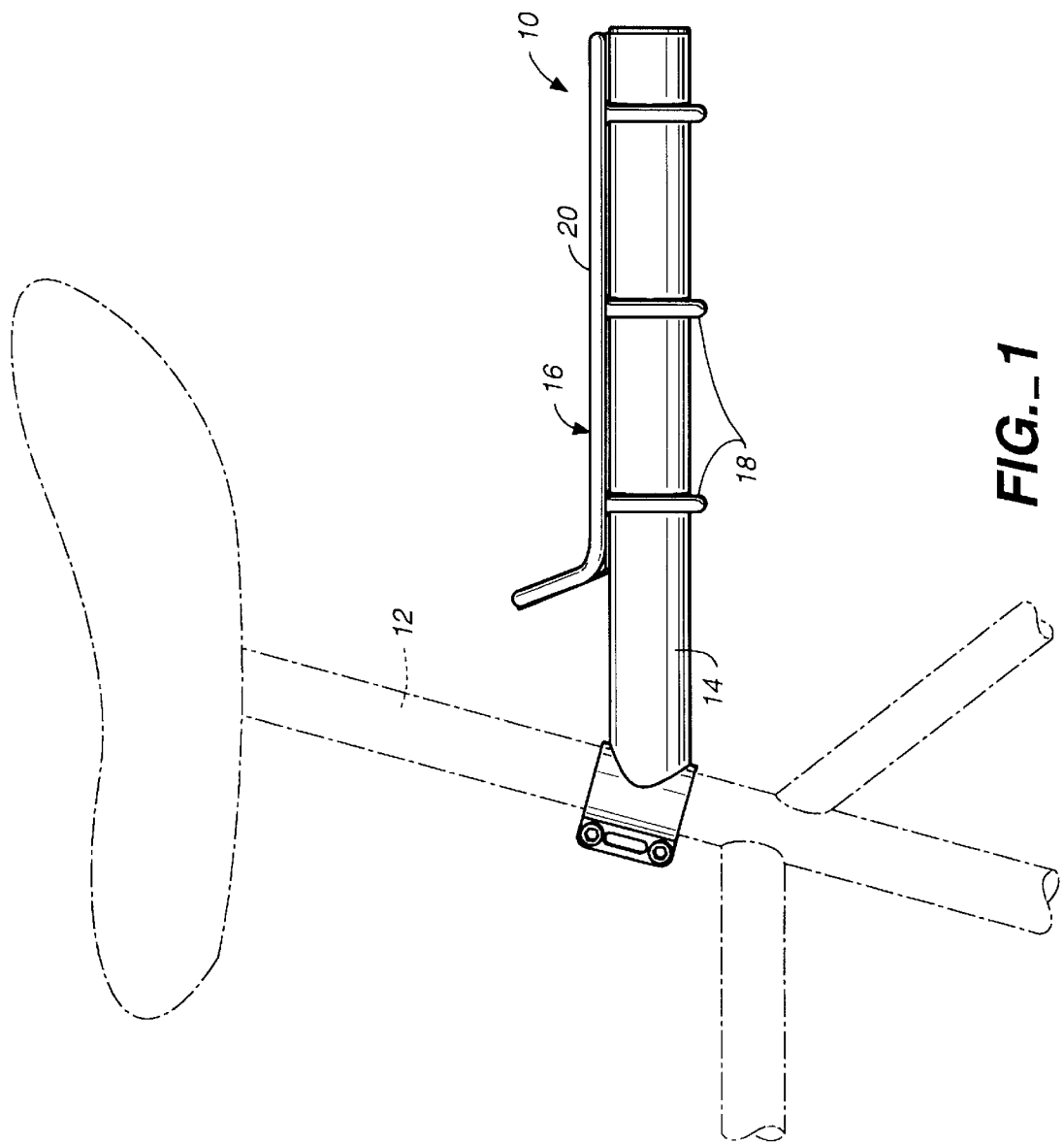
FIG._1

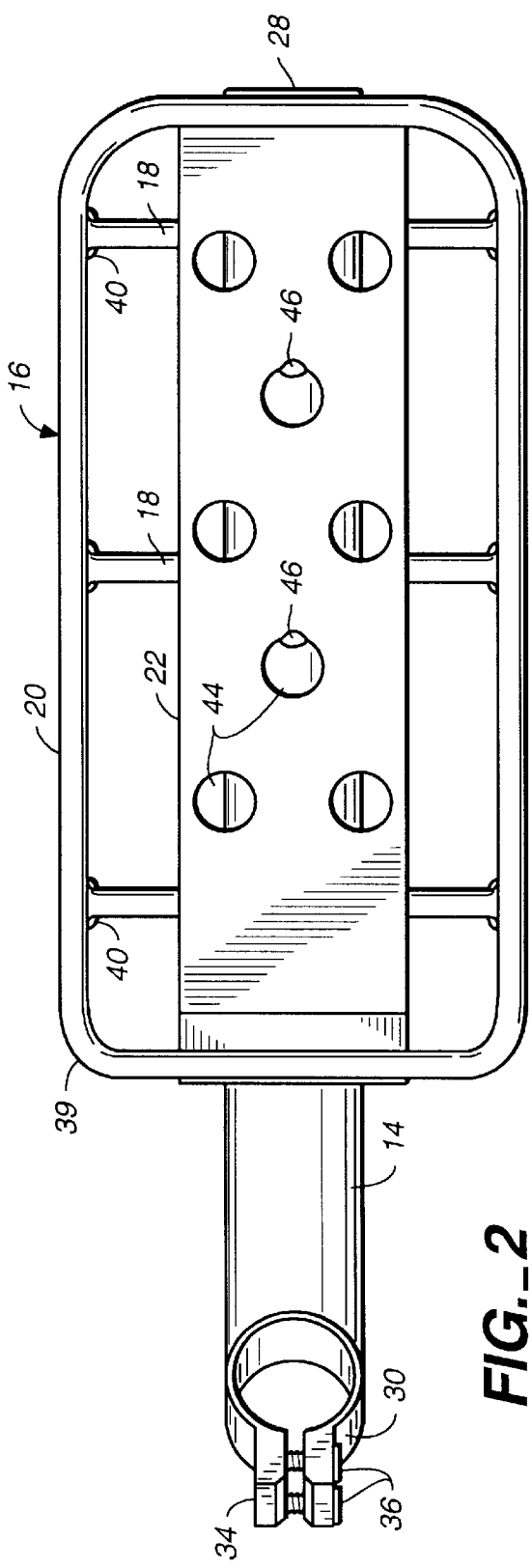
FIG._2
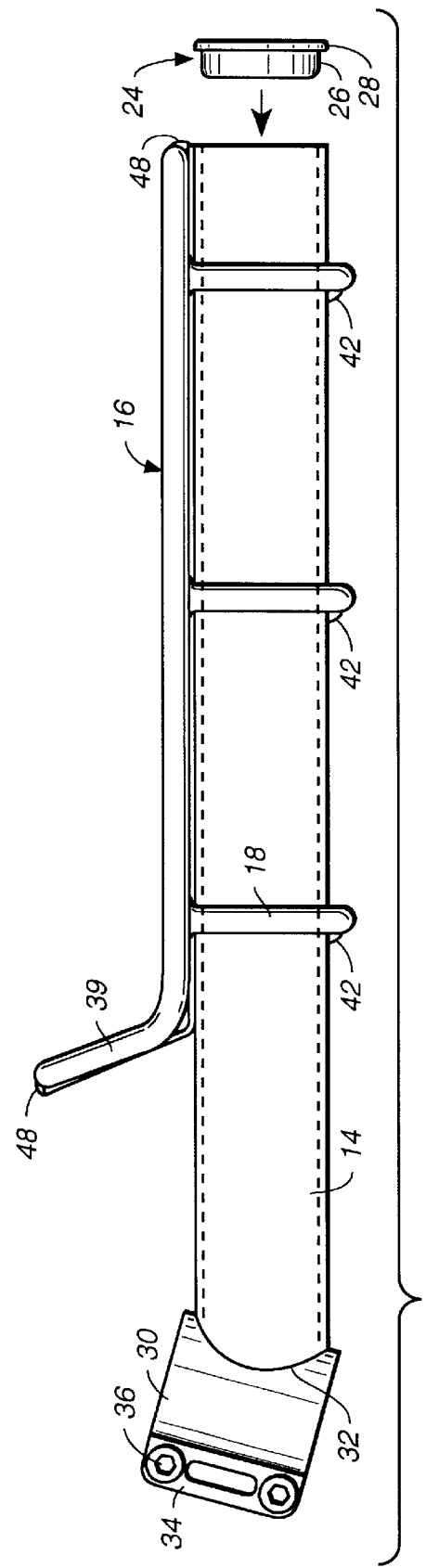
FIG._3

CANTILEVERED BIKE RACK

BACKGROUND OF THE INVENTION

This invention relates to accessories for bicycles and more particularly to a combined bicycle rack and storage device.

With the ever increasing popularity of bicycles including road bikes, mountain bikes and various racing bikes a need arose for a rack device capable of carrying loads externally as well as internally. For even short trips, a bicyclist often needs to carry such small but vital items such as keys, tools, repair kits and/or maps. Yet, a device having a compartment capable of carrying such items should also be able to accommodate externally some larger items, such as clothing articles, for example. A rack which provides both a compartment and the ability to support external items must also be strong, rigid and relatively easy to install with simple tools. The present invention solves this problem.

SUMMARY OF THE INVENTION

In accordance with the principles of the present invention, a bicycle rack is provided which comprises an enclosable compartment for relatively small items in combination with external structural members which form a cradle like configuration for somewhat larger items that the bicyclist wishes to carry. The enclosable compartment is essentially in the form of a rigid tube having an open, adjustable jaw section at one inner end which is attachable to the conventional cylindrical seat post of the bicycle. At the outer end of the tube is a removable cap or plug closure member which may have an outer reflective surface. Fixed to the exterior of the tube compartment is a cradle-like rack structure comprising a peripheral frame member secured by rib members to the tube. This exterior structure provides a support for larger items such as clothing articles which can readily be held on the rack structure by bungee cords in the manner commonly used by cyclists. The rack unit is easily attachable to a standard bicycle seat post by first removing the seat, inserting the jaw section around the post and tightening the flexible jaw sections to firmly anchor the rack.

Other object, advantages and features of the invention will become apparent from the following detailed description of one embodiment thereof, presented in conjunction with the accompanying drawing.

BRIEF DESCRIPTION OF THE DRAWING

FIG. 1 is a view in elevation of a bicycle storage rack according to the present invention as it appears when attached to the seat post of a bicycle.

FIG. 2 is a plan view of the bicycle rack shown in FIG. 1.

FIG. 3 is an exploded view in elevation of the bicycle rack of FIG. 1.

FIG. 4 is a rear end view of the bicycle rack of FIG. 1.

DETAILED DESCRIPTION OF EMBODIMENT

With reference to the drawing, FIGS. 1 and 2 show a bicycle storage rack 10 embodying principles of the present invention as it appears when installed on the seat post 12 of a typical bicycle (shown in phantom). In general, the storage rack 10 comprises an elongated, rigid, tubular or hollow body 14 which is attached to the bicycle seat post so that it is cantilevered from it and is oriented substantially horizontal with respect to the ground surface that normally supports the bicycle. Attached to the body 14 is a generally rectangular shaped frame 16 which is secured to the body by a plurality of struts 18. Within side portions 20 of the frame and attached tangentially to the upper outer surface of the body 14 is a support plate 22 for retaining items that may be carried externally on the storage rack 10.

An outer end cap 24 is provided for the body 14 so that smaller items such as keys, small tools, a repair kit or other items may be carried internally within the body. As shown in FIG. 3, the end cap 24 has a cylindrical plug portion 26 of yieldable elastomeric or plastic material that forms an interference fit with the inner wall of the tubular body and an outer flange member 28 that covers the end of the body when in place. The outer surface of the flange member is preferably covered with a reflective material such as a reflective paint so as to provide the bicycle with an additional high visibility device that increases rider safety, particularly at night.

To facilitate an easy, strong and reliable connection of the rack 10 to the bicycle, the body 14 has at its end, a clamp means in the form of generally cylindrical arcuate jaw segments 30 that are sized to fit around the bicycle seat post 12. The forward end of the tubular body 14 is welded to the joined jaw segments as indicated at numeral 32 in FIG. 3. Each jaw segment 30 has an extended lug portion 34 at its outer edge with holes for receiving a pair of machine screws 36 that extend to the opposite jaw segment. When the machine screws 36 are tightened, the jaw portions will flex to a degree that is sufficient to enable the rack 10 to be attached firmly to the seat post 12. If necessary, where the bicycle seat post is of a smaller size, a cylindrical, tubular shim (not shown) may be used to assure firm attachment of the rack 10.

As indicated in FIGS. 2–4, the rack frame 16 is preferably made from aluminum rod material which is bent in the desired shape. Extending from the forward ends of the side frame portions 20 is a frontal end portion 39 that extends upward at an angle to provide a barrier for external articles carried by the rack. The struts 18 of the frame 16 are preferably spaced apart at equal intervals and extend from the side frame portions 20 down around the bottom surface of the rack body 14. These struts are welded both at the side frame portions 20 and to the body as indicated by numerals 40 and 42.

The support plate 22 which is preferably formed from sheet metal, has a series of lightening holes 44 along its length which may also serve to retain bungee cords (not shown) which may be used to retain article externally on the rack 10. The plate 22 is narrower than the rack frame 16 and is preferably secured to the top surface of the body 14 by a series of spot welds 46. At its forward end, the support plate 22 has a frontal portion 48 that is bent upwardly to essentially the same angle as frontal end portion 39 of the frame 16. This provides a further barrier means to help retain articles attached externally to the rack.

From the foregoing, it is apparent that the present invention provides a unique bicycle storage rack 10 that is easy to mount or install on a bicycle seat post. In use, it affords a convenient means for carrying small articles internally as well as larger articles externally with the use of conventional bungee cords or straps. Yet, because of its light weight and cantilevered position on the bicycle, it does not interfere with or reduce efficient normal operation of the bicycle.

To those skilled in the art to which this invention relates, many changes in construction and widely differing embodiments and applications of the invention will make themselves known without departing from the spirit and scope of the invention. The disclosure and the description herein are purely illustrative and are not intended to be in any sense limiting.

What is claimed is:

1. A combined rack and storage device for a bicycle having a seat post, comprising:

an elongated rigid, cylindrical shaped, hollow body having a front end and a rear open end forming a storage compartment therein; said body having clamp means at said front end that is closeable for attaching said device to said bicycle seat post so that said body is cantilevered therefrom in substantially a horizontal position, and closure means at said rear open end for forming a closed but accessible storage compartment;

frame means attached to and supported above said body and having side portions extending outwardly therefrom above said body for supporting and carrying items that are too large to fit within said body compartment;

wherein said frame means comprises metal rod material formed in a generally rectangular shape with first and second side portions located above and outwardly spaced from opposite sides of said body, and strut members frame means in place on said body;

wherein said strut members frame means are spaced apart rods extending from the first side portion down around said body to the second side portion for securing said frame means to said body.

2. The device of claim 1 wherein said frame means includes an integral, generally U-shaped forward portion interconnecting said side portions that slopes upwardly from said body to provide a stop means for externally carried items.

3. The device of claim 1 including an internal plate member attached horizontally to the top of said body member and centered between said frame side portions.

4. The device of claim 1 wherein said clamp means comprises a pair of semi-cylindrical, flexible jaws, said jaws having outer flanges, and adjustable fastening means extending through said flanges for attaching them firmly around the bicycle seat post.

5. A combined rack and storage device for a bicycle having a seat post, comprising:

an elongated rigid, cylindrical shaped, hollow body having a front and a rear open end forming a storage compartment therein, said body having clamp means at said front end that is closeable for attaching said device to said bicycle seat post so that said body is cantilevered therefrom in substantially a horizontal position, and closure means at said rear open end for forming a closed but accessible storage compartment;

frame means attached to and supported above said body and having side portions extending outwardly therefrom above said body for supporting and carrying items that are too large to fit within said body compartment, said closure means comprises a plug portion of yieldable material which forms an interference fit with the open end of said body and an outer flange member fixed to one side of said plug portion and having an outer reflective surface.

\* \* \* \* \*